Sept. 25, 1962 E. P. McGROGAN, JR 3,056,048

PULSE GENERATOR EMPLOYING NEGATIVE RESISTANCE DIODES TO EFFECT HIGH VOLTAGE OUTPUT

Filed Dec. 8, 1959 2 Sheets-Sheet 1

INVENTOR.
ELLWOOD P. McGROGAN, JR.
BY John V. Regan
ATTORNEY

INVENTOR.
ELLWOOD P. McGROGAN, JR.
BY John V. Regan
ATTORNEY

Patented Sept. 25, 1962

3,056,048

PULSE GENERATOR EMPLOYING NEGATIVE RESISTANCE DIODES TO EFFECT HIGH VOLTAGE OUTPUT

Ellwood P. McGrogan, Jr., West Chester, Pa., assignor to Radio Corporation of America, a corporation of Delaware Filed Dec. 8, 1959, Ser. No. 858,206
12 Claims. (Cl. 307—88.5)

The present invention relates to new and improved circuits for generating pulses.

An object of the invention is to provide a simple circuit which can generate short pulses of either or both polarities at high repetition rates.

Another object of the invention is to provide a pulse generating circuit which is especially adaptable for use in computer applications and which can easily be synchronized from a central timing circuit.

Another object of the invention is to provide a pulse generating circuit which is relatively simple, trouble-free, and of low cost.

The circuit of the invention includes a pair of negative resistance diodes; means for applying an alternating signal to the diodes for simultaneosuly driving one towards its high state and the other towards its low state; and means for applying a switching signal to the diodes synchronously with the A.C. signal for selectively switching one or both diodes.

In one form of the invention, the diodes are connected in series anode-to-anode or cathode-to-cathode. In another form of the invention, the diodes are connected in opposition in two parallel branches. In both of these embodiments, the diodes may normally be in their low state in which case the alternating signal drives one towards its high state and the other away from its high state during one portion of each cycle and does the reverse during the other portion of each cycle. The switching signal may consist of pulses. If a positive pulse is applied coincidentally with the positive peak of the alternating signal, one of the diodes will switch from its low to its high state and similarly if a negative pulse is applied coincidentally with the negative peak of the alternating signal, the other diode will switch from its low to its high state. The switching of the diode is an abrupt transition from one value of voltage to a different value of voltage and is used to produce the output pulses.

The invention will be described in greater detail by reference to the following description taken in connection with the accompanying drawing in which.

Figure 1:
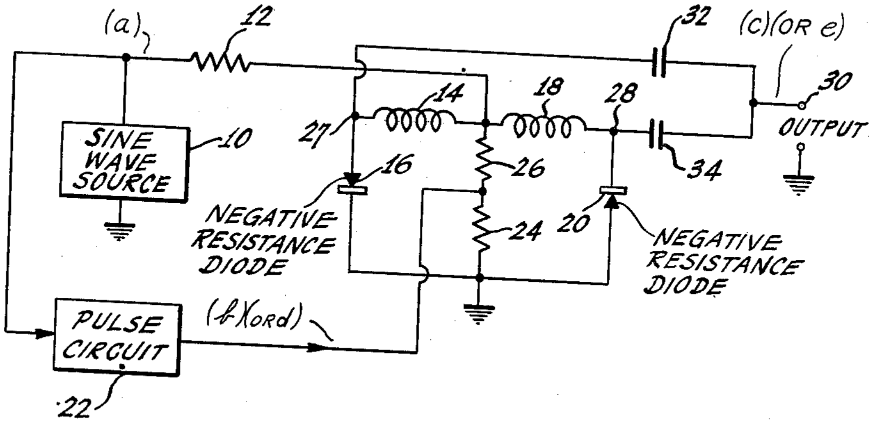
FIG. 1 is a block and schematic circuit diagram of one form of the present invention.

FIG. 1 should be referred to first. Sine wave source 10, which may be the central timing system or "clock" in a computer, is connected through coupling resistor 12 to a pair of parallel branch circuits. One of the branch circuits includes an inductor 14 and a negative resistance diode 16 and the other includes an inductor 18 and negative resistance diode 20. Negative resistance diode 16 is poled oppositely from negative resistance diode 20. Sine wave source 10 applies its output also to a pulse circuit 22. The latter is connected through a resistor 24 to ground and a resistor 26 to a terminal common to the two diode branch circuits. A common output terminal 30 is connected through coupling capacitors 32 and 34 to terminals 26 and 28, respectively. These terminals are at the anode of diode 16 and the cathode of diode 20, respectively.

Negative resistance diodes such as 16 and 20, also known as "tunnel diodes," are described in an article appearing in Proceedings of the IRE, July 1959, page 1201 and in the 1959 IRE Wescon Convention Record, Part III, pages 3 and 9. A voltage-current characteristic for a single diode such as 16 or 20 is as shown in quadrant I of FIG. 4. The diode has two positive resistance regions 36—38 and 40—42, and a negative resistance region 38—40. Generally speaking, the two positive resistance regions are stable operating regions. If the diode is initially operating at zero milliamperes and zero millivolts and the current through the diode is increased to a value less than that indicated by peak 38, the diode will reside in its low voltage positive resistance region 36—38. The voltage may be of the order of zero to 30 millivolts or so and the current, tens of milliamperes or so, the peak current value depending on the diode employed. When the current is increased to a value greater than that represented by point 38, the diode rapidly switches from its low voltage positive resistance region 36—38 to its high voltage positive resistance region 40—42. The latter is known as the high voltage state of the diode. The voltage across the diode may be of the order of 400 millivolts or so when it is in its high voltage state.

Figure 4:
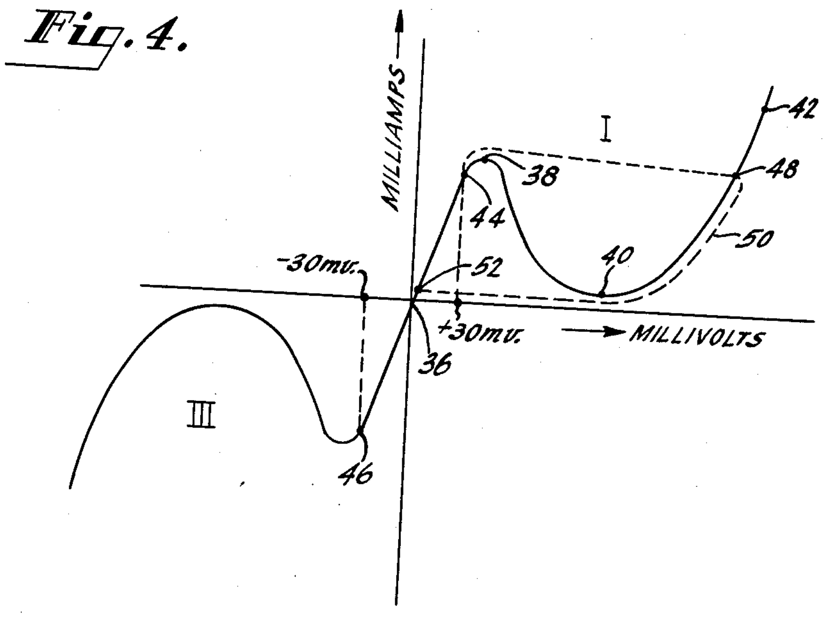
FIGS. 4 and 5 are graphs to help explain the operation of the circuits of FIGS. 1 and 2.

The circuit of FIG. 1 includes oppositely connected diodes in two parallel branches. The voltage-current characteristic for the two diodes may be represented as shown in FIG. 4. It may be assumed that the portion of the characteristic in quandrant I represents diode 16 and the portion of the characteristic in quadrant III represents diode 20.

The circuit of FIG. 1 may be operated in several different ways. In one mode of operation, the sinusoidal signal (FIG. 5*a*) from source 10 applied to the two branch circuits including diodes 16 and 20 is sufficient to vary the circuit operating point from 36, the intersection of the milliampere-millivolt axis, to 44, back to 36, to 46, back to 36. As is understood in the art, since the negative resistance diode is highly doped, it conducts in the reverse direction as well as in the forward direction. Accordingly, the sinusoidal signal varies the voltage across the diodes between perhaps −30 millivolts and +30 millivolts.

Figure 5:
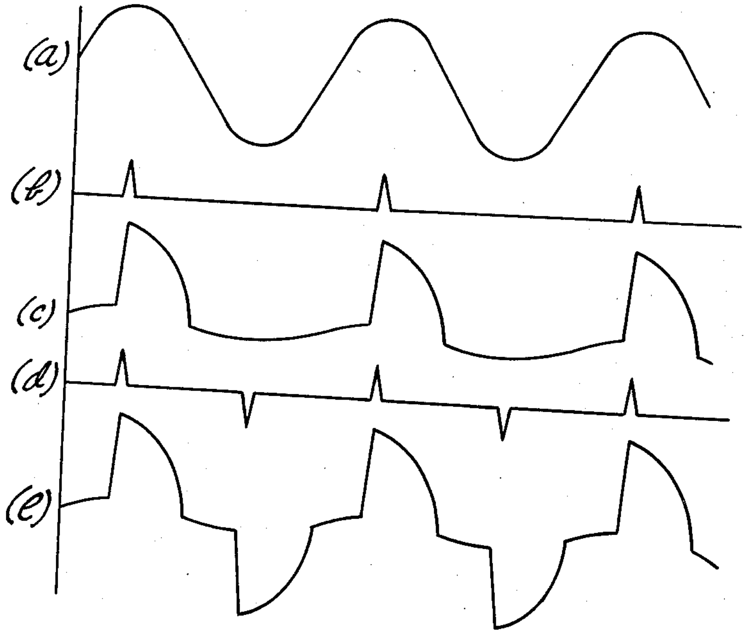

In the mode of operation discussed, the pulse circuit 22 produces positive pulses coincident with the positive peaks of the sine wave as shown in FIG. 5*b*. These pulses are applied through resistor 26 to both diodes. During the pulse interval, the sine wave has placed diode 16 at operating point 44 (FIG. 4). The pulses of FIG. 5*b* add to the sine wave and switch diode 16 from its low voltage state to its second stable operating point in the high voltage state. Due to the series inductor 14, the diode momentarily assumes a voltage and current indicated by the intersection 48 (FIG. 4). The value of voltage is relatively high—of the order of 400 millivolts, and the current is also high—possibly of the order of 30 to 50 milliamperes or so, depending upon the diode. This permits a substantial amount of power to be obtained from the diode. The abrupt transition from operating point 44 in the low voltage state to operating point 48 in the high voltage state appears at output terminal 30 as a high amplitude pulse such as is shown in FIG. 5*c*.

After a short interval of time, that is, after the inductor 14 has given up its energy to the load, the diode voltage reduces as indicated by dashed line 50 in FIG. 4. Shortly thereafter, the sinusoidal current through the diode reduces to a value lower than that indicated by point 40 and the diode switches back to an operating point in its low voltage state, as is shown at 52.

In another mode of circuit operation, alternate positive and negative pulses are produced in response to the sine wave applied to pulse circuit 22. These are shown in FIG. 5*d*. The positive pulses are time coincident with the positive peaks of the sine wave and the negative pulses are coincident with the negative peaks of the sine wave. The positive pulses switch diode 16 from its low to its high voltage state in the manner already indicated, and the negative pulses switch diode 20 from its low to its high state in a similar manner.

Some important advantages of this circuit are that it is capable of operating at very high speeds—pulse repetition rates of well upwards of 10 megacycles per second are feasible; the pulses produced can be short—of the order of 30 millimicroseconds or less in duration. The circuit is automatically reset by the sine wave signal which effectively causes each diode to operate in a monostable condition (to return to zero output after each pulse).

FIGS. 5*c* and 5*e* show the output pulses of the circuit to be superimposed on a sinusoidal base line. It will be appreciated, of course, that this base line can be removed by appropriate filtering, clamping, or cancellation.

The pulse circuit 22 is not shown in detail as any one of a number of circuits may be employed. For example, the sine wave may be phase shifted 90° in circuits 22, the phase shifted sine wave converted to a square wave, and the square wave differentiated to produce the alternate positive and negative pulses of FIG. 5*d*. The wave of FIG. 5*b* can be produced from wave of FIG. 5*d* by properly biased diode clamper, for example. Numerous other circuits may be employed.

It has not been indicated whether the diodes are driven from a constant current or a constant voltage source. Either one is suitable. Normally, if the diodes are quiescently biased to a value such that they may assume either one of the two voltage states, and a constant current load line is employed, the diodes may remain in either the high state or the low state. However, in the present circuit there is no D.C. bias and the sinusoidal signal prevents either diode from remaining in the high voltage state.

One further point should be mentioned concerning circuit operation. In the modes discussed above, the sine wave drives the diode between operating points 44 and 46 (FIG. 4). It is also possible to adjust the sine wave amplitude to a value such that the sine wave itself switches the two diodes at the positive and negative peaks of the wave. In this case, the diodes can be selectively prevented from switching by selectively applying inhibit pulses coincident with the peaks of the sine wave and of opposite polarity to the sine wave. For example, if negative pulses are applied coincident with the positive peaks, all negative output pulses will be produced and these will be coincident with the negative peaks of the sine wave.

Figure 2:
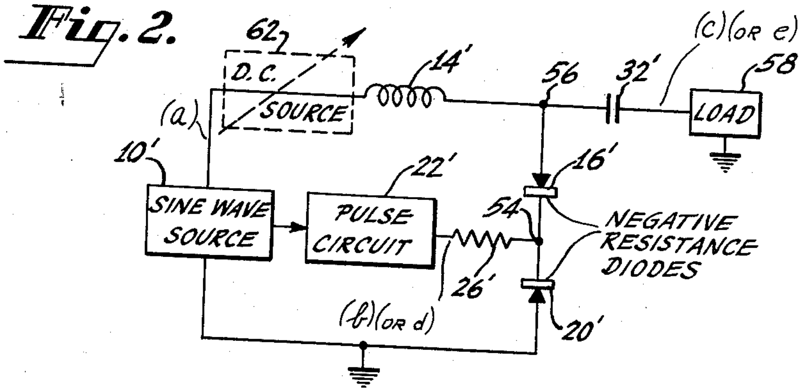
FIG. 2 is a block and schematic circuit diagram of another form of the present invention.

The circuit of FIG. 2 may be operated similarly to the circuit of FIG. 1 and similar reference numerals primed have been applied to analogous elements. In the circuit of FIG. 1, the two diodes are oppositely connected in parallel branches, whereas in the circuit of FIG. 2, the diodes are oppositely connected in series. The voltage-current characteristic for the diodes is similar to that shown in FIG. 4. The triggering pulse may be injected at the junction 54 between the two diodes or at terminal 56, if desired. The load circuit is represented by block 58 in FIG. 2 and it may be a tunnel diode memory or the like.

The circuit of FIG. 2 may be operated by applying a sine wave of insufficient amplitude to cause either diode to switch to the high state (operation between points 44 and 46 of FIG. 4) and pulses may be applied as shown in FIG. 5*b* or 5*d* synchronously with the sine wave peaks as indicated in FIG. 5*a*. Instead, negative pulses coincident with the negative peaks of the sine wave may be used here or in the embodiment of FIG. 1. Alternatively, the sine wave may be of an amplitude just sufficient to switch both diodes once each cycle and inhibit pulses selectively applied to prevent either one or both diodes from switching, as desired.

Figure 3:
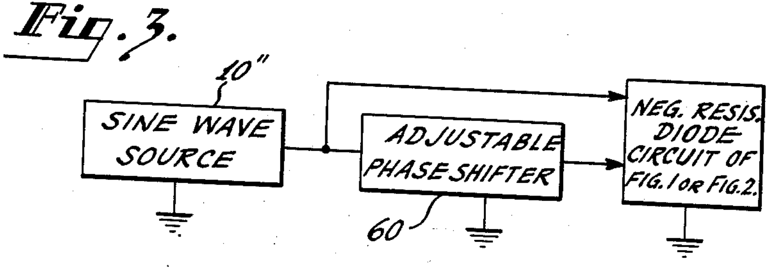
FIG. 3 is a block circuit diagram of a modified form of the invention.

In the embodiment of FIG. 3, an adjustable phase shifter 60 is substituted for the pulse circuit. It applies a portion of the sinusoidal signal to the diodes of FIG. 1 or FIG. 2 in order either to trigger the diodes or to inhibit the diodes. In the embodiment of FIG. 1, if the triggering sine wave signal is in phase with the sine wave power supply signal, the diodes are triggered at the peaks of the sine wave signals, whereas if the triggering sine wave is 180° out of phase with the power supply wave neither diode is triggered. The circuit of FIG. 2 may be connected as shown and driven between operating points 44 and 46 (FIG. 4) by the power supply sine wave. If the triggering sine wave signal is 180° out of phase with the power supply sine wave signal, diode 16' is triggered only during the positive peak of the power supply sine wave (and the negative peak of the triggering sine wave), and diode 20' is never triggered. If the triggering sine wave signal is in phase with the power supply sine wave signal, then diode 20' is triggered at the negative peaks of sine wave and diode 16' is never triggered. On the other hand, if the triggering sine wave signal is applied to terminal 56, the circuit functions similarly to the circuit of FIG. 1.

The circuits of FIGS. 1 and 2 can also be triggered in yet another way, namely a direct current source in series with the sine wave source. If, for example, a positive direct current is added to the sine wave produced by source 10' in FIG. 2, diode 16' is switched and if a negative direct current is added, diode 20' is switched. An adjusted direct current source is indicated schematically in FIG. 2 by dashed block 62.

In the embodiments of the invention described, one or both of the diodes are switched once each sine wave cycle. This is not essential. The pulses can be applied selectively, that is, only when it is desired to switch a diode. Thus, for example, a positive pulse may be applied coincident with a sine wave peak once every second, third or *n*th peak or, if desired, in an aperiodic fashion. A gate circuit in series with the pulse circuit may be used to control the application of the pulses.

What is claimed is:

1. In combination, a circuit including two negative resistance diodes quiescently in their low state; and means for applying an alternating signal to both diodes for simultaneously driving one towards its high state and the other away from its high state.

2. In combination, a circuit including two negative resistance diodes quiescently in their low state; and means including inductive coupling means for applying an alternating signal to both diodes for simultaneously driving one towards its high state and the other away from its high state.

3. In combination, a circuit including two negative resistance diodes normally in their low state; means for applying an alternating signal to both diodes for driving one towards its high state and the other away from its high state during one portion of each cycle, and said other towards its high state and said one away from its high state during the remainder of each cycle; and means for applying a pulse to said diodes during the peak portion of said alternating signal of the same sense as said peak portion and of sufficient amplitude to switch one of said diodes to its high state.

4. In combination, a circuit including two negative resistance diodes normally in their low state; means for applying an alternating signal to both diodes for driving one towards its high state and the other away from its high state during one portion of each cycle, and said other towards its high state and said one away from its high state during the remainder of each cycle; and means for applying to said diodes pulses of one polarity coincident with peak portions of the same polarity of said alternating signal, and pulses of opposite polarity coincident with the opposite peak portions of said alternating signal, the pulses, when added to the peaks of the alternating signal, being of sufficient amplitude alternately to switch said diodes from their low to their high states.

5. In combination, a pair of negative resistance diodes each capable of assuming one of two different voltage levels at a given value of current; means for applying a sinusoidal current to the diodes for simultaneously driving a current in one direction through one and in the opposite direction through the other; and means for controlling the switching of said diodes comprising means for applying an alternating current to said diodes.

6. In the combination as set forth in claim 5, said diodes being connected in series, like element to like element.

7. In the combination as set forth in claim 6, a circuit including two parallel branches, one of the diodes being in each branch, and one of the diodes being poled oppositely from the other.

8. In the combination as set forth in claim 5, said means for applying an alternating current comprising an adjustable phase shifter connected to said means for applying a sinusoidal current.

9. In the combination as set forth in claim 5, said means for applying an alternating current comprising means synchronized by said sinusoidal current for producing pulses.

10. In combination, a circuit including two tunnel diodes quiescently in their low state; and means for applying an alternating signal to both diodes for simultaneously driving one towards its high state and the other away from its high state.

11. In combination, two tunnel diodes connected in series, like electrode to like electrode, quiescently in their low voltage state; and means for applying a sinusoidal signal across the two diodes for simultaneously driving one towards its high state and the other away from its high state.

12. In the combination as set forth in claim 11, further including means for applying a pulse to the two diodes during an interval when one of them is driven by the sinusoidal wave to a point close to its current peak in a sense to switch that diode to its high state.

References Cited in the file of this patent

UNITED STATES PATENTS 2,944,164 Odell et al. -------------- July 5, 1960

FOREIGN PATENTS 159,041 Australia -------------- Sept. 27, 1954

OTHER REFERENCES

Tunnel Diode: Big Impact? Page 61, Electronics, Aug. 7, 1959.